US012635058B2

(12) United States Patent　　　(10) Patent No.:　US 12,635,058 B2
Saure et al.　　　(45) Date of Patent:　May 19, 2026

(54) METHOD FOR ADDING AND/OR EXTENDING AT LEAST ONE LIGHT FUNCTION OF AT LEAST ONE LIGHT SOURCE IN AT LEAST ONE VEHICLE

(71) Applicant: HELLA GMBH & CO. KGAA, Lippstadt (DE)

(72) Inventors: Mario Saure, Lippstadt (DE); Tobias Wartzek, Lippstadt (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 239 days.

(21) Appl. No.: 18/290,549

(22) PCT Filed: Apr. 28, 2022

(86) PCT No.: PCT/EP2022/061300

§ 371 (c)(1),
(2) Date: May 15, 2024

(87) PCT Pub. No.: WO2022/253497

PCT Pub. Date: Dec. 8, 2022

(65) Prior Publication Data

US 2025/0351251 A1　　Nov. 13, 2025

(30) Foreign Application Priority Data

May 31, 2021　(DE) ......................... 102021113967.8

(51) Int. Cl.
*H05B 47/17*　　(2020.01)
*B60Q 1/14*　　(2006.01)

(52) U.S. Cl.
CPC ........... *H05B 47/17* (2020.01); *B60Q 1/1423* (2013.01); *B60Q 2900/30* (2013.01)

(58) Field of Classification Search
CPC ... H05B 47/17; B60Q 1/1423; B60Q 2900/30
See application file for complete search history.

(56) References Cited

U.S. PATENT DOCUMENTS

| 10,688,920 B1* | 6/2020 | Neubauer | .............. B60Q 1/507 |
| 10,773,635 B1 | 9/2020 | Adams-Campos et al. | |
| 2018/0215309 A1* | 8/2018 | Reinprecht | .......... B60Q 1/1423 |

FOREIGN PATENT DOCUMENTS

| DE | 102011055794 A1 | 5/2013 |
| DE | 102019100491 A1 | 6/2020 |
| EP | 3620330 A1 | 3/2020 |

* cited by examiner

*Primary Examiner* — Renan Luque
(74) *Attorney, Agent, or Firm* — WARNER NORCROSS + JUDD LLP

(57) ABSTRACT

A method is disclosed for adding and/or extending at least one light function of at least one light source in at least one vehicle. The method comprises the following steps performed outside the at least one vehicle, in particular in a computer system that is physically remote from the at least one vehicle: receiving at least one requested light function for the implementation by the at least one light source in the at least one vehicle, checking whether the at least one requested light function satisfies at least one condition of the at least one light source, and adding and/or extending the at least one requested light function for the implementation of the at least one requested light function by the at least one light source, provided that the at least one requested light function satisfies the at least one condition.

10 Claims, 4 Drawing Sheets

METHOD FOR ADDING AND/OR EXTENDING AT LEAST ONE LIGHT FUNCTION OF AT LEAST ONE LIGHT SOURCE IN AT LEAST ONE VEHICLE

CROSS-REFERENCE TO RELATED APPLICATIONS

This application is the National Stage of International Application No. PCT/EP2022/061300 filed on 28 Apr. 2022, which claims priority to and all advantages of German Patent Application No. 10 2021 113 967.8 filed on 31 May 2021, the disclosures of which are hereby incorporated by reference in their entirety.

FIELD OF THE DISCLOSURE

The invention relates to a method for adding and/or extending at least one light function of at least one light source in at least one vehicle, a computer system for adding and/or extending at least one light function of at least one light source in at least one vehicle, a computer program, and a computer-readable storage medium.

BACKGROUND

The light functions of light sources are limited in the vehicles of today. By way of example, a control device of a headlight, which controls the light output, is limited by its development back in its day, as well as the control device, to predetermined light functions of the headlight. The only interface of the control device of this light source is an interface to the higher-level control device, which can be an on-board power supply control device. The end user of the vehicle can only switch a light function on or off at the headlight.

It is desirable to overcome the limitation whereby the functionality of light sources in the vehicle is frozen in time during system design in the development stage.

A well-known approach in this direction is the ability to enable or disable enabled light functions of a light source, such as automated high beams. However, this approach does not allow any individualization by the end user.

SUMMARY

The present invention is based on the task of providing a simple, safe and reliable opportunity for the end user to individualize light functions of light sources in vehicles.

The foregoing task is solved by the instant invention. The task is, in particular, solved by a method for adding and/or extending at least one light function of at least one light source in at least one vehicle. The task is, moreover, solved by a computer system for adding and/or extending at least one light function of at least one light source in at least one vehicle, by a computer program, and by a computer readable storage medium. Further advantages and details of the invention result from further embodiments described herein. Features and details described in connection with the method according to the invention naturally also apply in connection with the computer system according to the invention, the computer program according to the invention, and the storage medium according to the invention, and respectively vice versa, so that reference is or can always be made mutually to the individual aspects of the invention with respect to the disclosure.

According to a first aspect of the invention, the task is solved by a method for adding and/or extending at least one light function of at least one light source in at least one vehicle. The method comprises the following steps, which are performed outside of the at least one vehicle, in particular in a computer system physically remote from the at least one vehicle:

receiving at least one requested light function for the implementation by the at least one light source in the at least one vehicle, checking whether the at least one requested light function satisfies at least one condition of the at least one light source, and adding and/or extending the at least one requested light function for the implementation of the at least one requested light function by the at least one light source, provided that the at least one requested light function satisfies the at least one condition.

Accordingly, the method according to the invention provides a possibility for light functions of light sources in vehicles to not be limited to the system design in the development stage, but rather to be individualized by the end user of the vehicle or by a third party. Different light functions on different light sources and on different vehicles can be requested and added or extended by means of the method according to the invention.

In the context of the invention, a light function is understood to be a function or an operation of a light source that leads to the illumination or generation of light of the light source in a manner determined in accordance with this function or operation. When discussing light function it is thus not only understood to mean, for example, a low beam and a high beam, but instead, the light function can be varied over a wide range, for example, using specific light parameters, in order to generate different lights at the light sources.

A light function can be geared to the illumination or lighting for which the respective light source on the vehicle is configured or for which the respective light source on the vehicle is used. The requested and added or extended light functions do not, however, need to be limited to the aforementioned purpose; rather, other purposes can also be covered by a requested light function, such as, in particular, light designs, distributions of light or light animations that can be implemented by means of one or more light sources on a vehicle. In principle, such light functions can be used to display advertising, music-synchronized light shows, individual symbols or texts, etc., which are expressed by means of the light function. It may be provided that a requested light function uses several light sources together in order to implement the respective light function.

A requested light function can not only extend light functions that already exist or are available on the vehicle, but rather can, in particular, also be such a light function, but rather can also add new light functions that cannot yet be implemented by the light source. In this context, the adding and/or extending can be understood as a process that is performed outside the vehicle, in particular in the computer system, and adds the requested and checked light function or extends an existing light function for the vehicle.

In the method according to the invention, a first step is provided in such a way that one or a plurality of requested light functions that are to be implemented by one or a plurality of light sources of one or more vehicles are received. The receiving of said one or plurality of requested light functions may be preceded by a step of requesting said at least one requested light function. This step may also be performed outside the vehicle and, in particular, outside the computer system. It may be performed by a corresponding terminal of an end user or of a third party, for example, a smartphone, a computer, or the like. The terminal may comprise a communication unit or transmission unit. A signal comprising the at least one requested light function, for example, in the form of computer code, may be transmitted, by means of the transmission unit, to the computer system receiving the at least one requested light function. For this purpose, a special application can be set up on the terminal that is compatible with the computer system, in particular is set up for communication with the computer system. Authentication can also take place between the terminal, in particular the application located thereon, and the computer system, such that access to the request for light functions is only permitted to an end user or to a third party for those vehicles for which they are authorized, which is to say, in particular for which they are the owner.

The checking step follows the receiving step of the at least one requested light function. By checking the requested light function(s) against one or more conditions, it can be ensured that the requested light function can be implemented and/or is permissible before it can be implemented or is implemented. The checking step thus represents a monitoring entity for ensuring the simple, safe, and reliable individualization of light functions on the vehicle. Without the checking step, it could not be ensured that the requested light functions can actually be implemented and/or are permissible, which is determined by the at least one condition of the light source. The at least one condition can be defined or alternatively specified in advance. Each light source may, moreover, have its own or alternatively other conditions.

Lastly, the addition and/or extension of the at least one requested light function following the checking step can enable the (subsequent) implementation thereof by the at least one light source of the at least one vehicle. For this purpose, all requested light functions must satisfy the one or more conditions of the at least one light source. The addition and/or extension can take place in the computer system, in particular a data memory, and/or in the vehicle. A corresponding wireless communication link can be used for the transmission from the computer system to the vehicle of the added and/or extended light functions or the light functions to be added and/or extended. As will be elucidated in more detail below, an enabling signal for extending and/or adding the requested and checked light functions can be sent to the vehicle or to the light source or to a control device assigned to it, where it can be stored. Then, the thereby extended or added light functions, and thus enabled and optionally stored in the vehicle, can be implemented.

If the at least one condition of the at least one light source is not satisfied by the at least one requested light function, it can be provided that the at least one requested light function is rejected. For this purpose, it is possible that a signal or a message about the rejected light function with a corresponding reason or error message can be sent, in particular, by the computer system and by means of the communication unit or transmission unit thereof. This signal can be sent, in particular, to the end user or alternatively their terminal.

The method according to the invention can be a computer-implemented method, in which some or all steps can be implemented on a computer or alternatively on the computer system. The computer system may, in particular, be physically remote from the at least one vehicle, which is to say, it is, in particular, not part of the at least one vehicle on which the requested light functions are to be implemented.

It may be provided that the at least one light source is an exterior lighting of the vehicle. Possible exterior lightings on the vehicle are, for example, headlights, taillights, decorative lights, signal lights, etc. The regulations for exterior lighting on the vehicle are particularly numerous and stringent with respect to their relevance for the safety of road users. Notwithstanding these regulations, the method according to the invention can provide a safe individualization of exterior lighting on one or more vehicles. Alternatively, or additionally, the at least one light source or further light sources of the vehicle may be interior (ambient) lighting, such as, by way of example, decorative lighting and the like.

It may also be provided that the at least one condition relates to a technical limitation of the at least one light source. In other words, the at least one condition of the at least one light source may be a technical condition. By way of example, the technical condition may specify an available brightness range or an available color spectrum of the at least one light source. If the brightness of requested light function is in the available brightness range and/or the color of requested light function is in the available color spectrum, the requested light function is extended or added accordingly if this is the only condition to be satisfied in the checking step. Otherwise, if the requested brightness, for example, is above the available or technically realizable brightness of the at least one light source, the requested light function can be rejected.

Moreover, it may be provided that the at least one condition relates to a regulatory limitation of the at least one light source. In other words, the at least one condition may be a regulatory condition. Unlike a technical condition, a regulatory condition is not related to what the at least one light source is able to achieve from a technical point of view, but rather what is allowed according to predetermined regulations. These can be, for example, vehicle-manufacturing regulations that are implemented by the regulatory conditions or limitations. It is, in particular, possible that the regulatory restrictions implement laws or are set or standardized by the legislator. This can prevent the light sources of a vehicle from being used contrary to the wishes of the vehicle manufacturer and/or, in particular, contrary to existing laws or alternatively, standards. In this way, it can be ensured that only those requested light functions are added or extended and thus made implementable that are in line with the regulatory restrictions. Of course, it is also possible that both technical and regulatory conditions coexist, which conditions will be checked.

Furthermore, it can be provided that the at least one condition relates to a prioritization of light functions that can be implemented or alternatively are implemented simultaneously by the at least one light source. In this way, a priority or, alternatively, hierarchy for the implementation of light functions at the light source, in particular the requested light source(s), can be defined. In this way, for example, it can be ensured that safety-relevant light functions, such as the low beam, do not compete with light functions added later or alternatively do not impair safety when driving the vehicle. It is of course possible that technical, regulatory and/or prioritization conditions relating to simultaneously implementable light functions coexist, which conditions will be checked.

Furthermore, it can be provided that the method comprises the further step of processing the at least one requested light function. This step can also be performed outside the at least one vehicle, in particular in the computer system. The step may be supported by artificial intelligence. Alternatively, or additionally, the step may be supported by a human.

In particular, the step of processing the at least one requested light function may comprise adapting the at least one requested light function to the at least one condition. In this way, it can be ensured that the requested light functions are added or extended in spite of the conditions of the light sources not being met or in spite of a lack of compliance with the conditions to be met. In this case, they are, however, modified or alternatively adapted to the at least one condition in such a way that they can be added or extended. In the example of the requested light function with overly high brightness, which brightness exceeds the maximum brightness technically achievable by the light source, a rejection of the requested light function can accordingly be avoided. Instead, the parameter relating to brightness in the requested light function can be adapted to the maximum brightness of the light source that is to perform the requested light function in the vehicle. A signal containing information about the change or alternatively processing of the requested light function may be sent from the computer system to the terminal of the end user or of the third party to inform the end user or the third party thereof.

Moreover, it may be provided that the method comprises the further step of programming the at least one requested light function. This step can also be performed outside the at least one vehicle, in particular in the computer system. To this extent, the method or alternatively the computer system can take over the programming of the requested light function for the end user and the third party. The input on the part of the end user or the third party on their terminal, for example, in a corresponding application, can thus be comparatively simple or alternatively can comprise preselected functions or parameters. This makes it particularly easy for the end user and third party to manage the requesting of light functions.

In particular, the step of programming the at least one requested light function can be performed while adapting the at least one requested light function to the at least one light source and/or to the at least one vehicle. Thereby, the method provides a simple possibility by means of which the end user can have a specific requested light function implemented independently of the specific light source or the specific vehicle or its manufacturer.

It may, moreover, be provided that the at least one requested light function comprises a set of parameters for the at least one light source. The set of parameters may comprise various parameters, in particular light parameters, such as, for example, brightness, color, light beam range, light duration, and the like. The requested light function can thus be expressed as a set of parameters. This enables a simple processing of the requested light function or alternatively a simple checking of the requested light function against the conditions of the light sources, which in turn can set limits for these parameters. In addition, the requested light function may also include other requirements that are not or cannot be expressed as a set of parameters. An example of this is a light animation or light sequence.

It may also be provided that the method comprises the further step of sending an enabling signal to the at least one vehicle for the implementation of the at least one requested light function by the at least one light source, provided that the at least one requested light function satisfies the at least one condition. The sending of the enabling signal can take place immediately after the addition and/or extension of the at least one requested light function and thus in particular outside the vehicle or alternatively by means of the computer system. The enabling signal can be sent and accordingly received by the vehicle, by the computer system in the course of the adding and/or extending of the at least one requested light function. The received enabling signal can add and/or extend the requested light function in the at least one light source or in a control device assigned to this at least one light source and thus enable the implementation of the requested light function when this at least one light source is accordingly switched on or alternatively activated. For this purpose, the enabling signal may comprise corresponding information, in particular a computer or alternatively control code, which code can be implemented at the light source or a control device assigned to the light source in order to implement the corresponding light function. This can ensure that only light functions added and/or extended in this way are implemented on the vehicle. The end user or third party can then use the light function added and/or extended in this way by means of their terminal or the operation thereof on the vehicle. Alternatively or additionally, it is possible that the computer system itself sends an implementation signal for implementing the added and/or extended light functions to the at least one light source of the vehicle. In this case, the terminal can only first implement the added and/or extended light function via a corresponding signal to the computer system.

It may, moreover, be provided that the method comprises the step of identifying the at least one light source in the at least one vehicle. In this way, it is possible that conditions, for example, technical ones, can be set up, even if the light source or alternatively the vehicle are not known in advance. In this manner, light functions can also be individualized for different vehicles that are not known or of which no data is known.

The step of identifying the at least one light source may, in particular, comprise detection of an association that assigns bus signals, which may be sent to the at least one light source, with light functions that can be performed by the at least one light source. The bus signals, which can also be referred to as control signals, when implemented on a corresponding control device of the light source, lead to the performing of the corresponding light function. Correspondingly, the technical conditions or alternatively technical limitations of the light source can be easily obtained or alternatively established by means of a detection of the association by the computer system.

According to a second aspect of the invention, the aforementioned task is solved by a computer system for adding and/or extending at least one light function of at least one light source in at least one vehicle, wherein the computer system is configured for communication with the at least one vehicle and wherein the computer system is configured to perform the method according to the first aspect of the invention.

The computer system may comprise one or more computers. The computer or computers may comprise the known units such as processor, storage medium, etc. The computer system may comprise corresponding communication units or alternatively transmitting and receiving units for, in particular wireless, communication with the terminal of the end user and of the vehicle. Communication can, for example, take place via the Internet or local networks and by way of example, radio technology, in particular mobile radio technology, can be used as the technology for the transmission of data. The computer system may be a so-called computer cloud or cloud computing or, in other words, the computer or computers implementing the method may originate from a computer cloud.

According to a third aspect of the invention, the initially mentioned task is solved by a computer program comprising instructions which, when the program is implemented by a computer or alternatively a computer system, cause the computer or computer system to perform the method according to the first aspect of the invention.

According to a third aspect of the invention, the initially mentioned task is solved by a computer-readable storage medium comprising instructions which, when implemented by a computer or alternatively a computer system, cause the computer or computer system to perform the method according to the first aspect of the invention.

BRIEF DESCRIPTION OF DRAWINGS

The invention will be elucidated in more detail below with reference to the accompanying drawings. Elements with the same function and/or mode of operation are each provided with the same reference signs in FIG. 1 through FIG. 4. These figures are schematic representations wherein.

Identical, functionally identical or structurally identical elements are designated with the same reference signs in FIG. 1 through FIG. 4. Insofar as an identical, functionally identical or structurally identical element is present more than once in the same figure, it is designated by the same reference sign and is numbered consecutively only to differentiate the elements from one another. The number and arrangement of identical, functionally identical or structurally identical elements within the meaning of the invention are thus in no way limited, but are merely indicated by way of example, unless otherwise specified. The consecutive numbering is separated from the reference sign by a dot.

DETAILED DESCRIPTION

Figure 1:
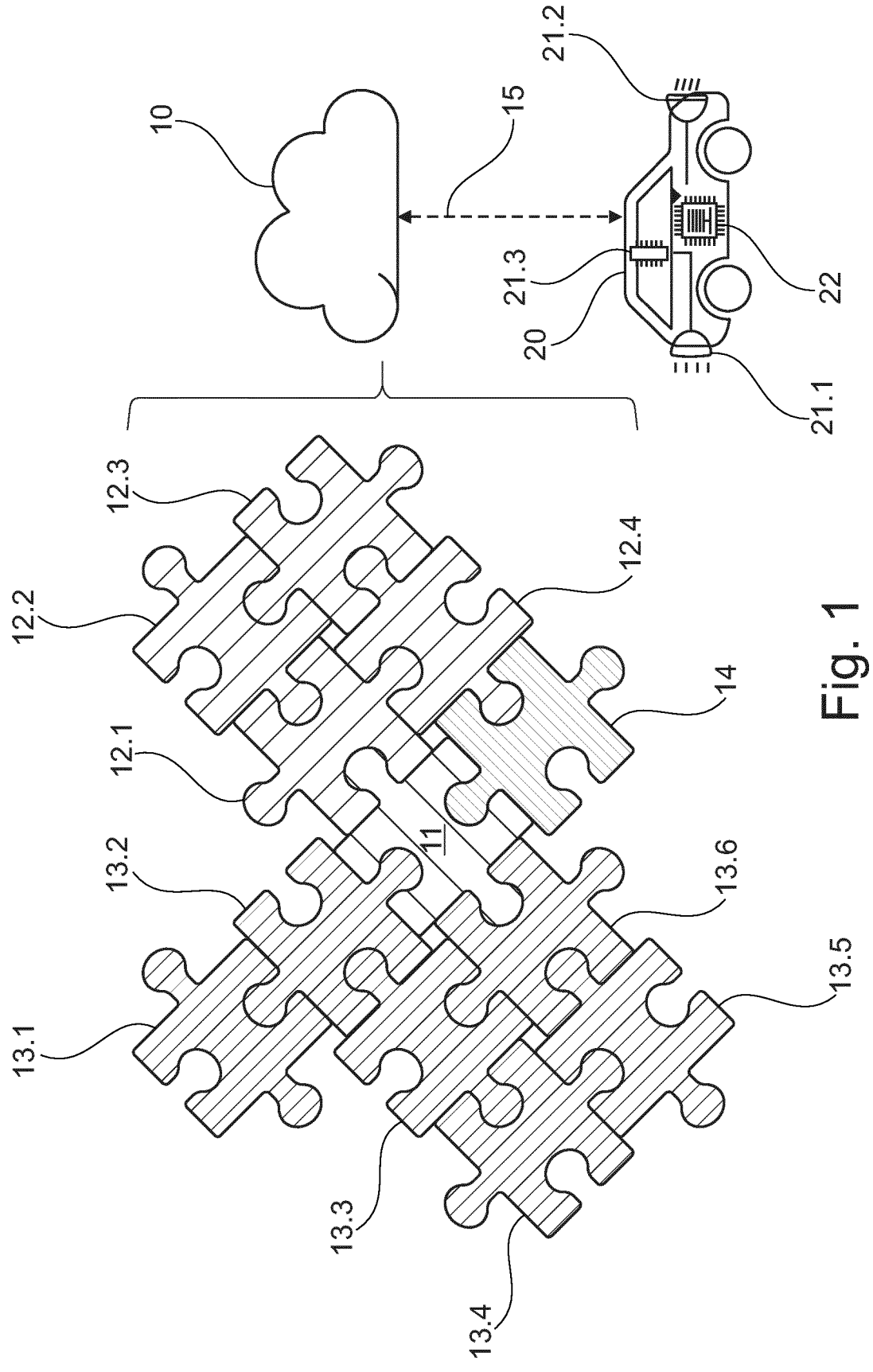
FIG. 1 shows a schematic view of a system comprising a computer system and a vehicle.
Figure 4:
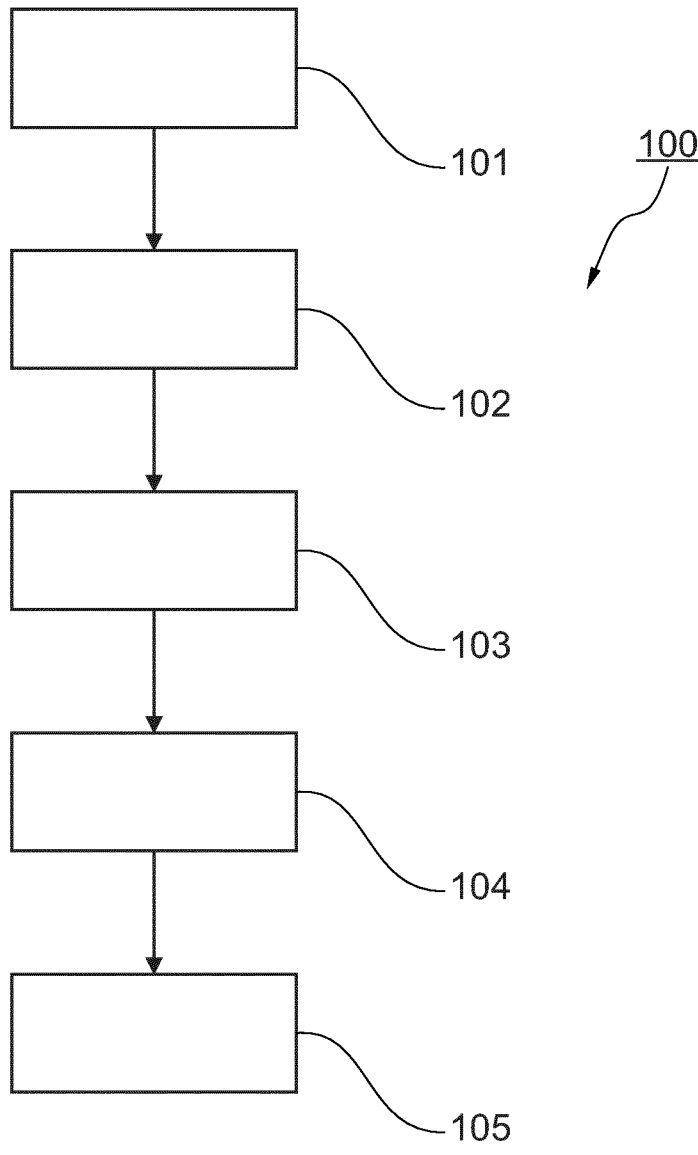
FIG. 4 shows a schematic view of a method for adding and/or extending requested light functions.

FIG. 1 shows a computer system 10 in the form of a computer cloud which is equipped with a computer program (not shown) which, upon implementation of the instructions of the computer program, implements the method 100 that is schematically illustrated in FIG. 4.

The computer program has individual program building blocks 11, 12.1, 12.2, 12.3, 12.4, that are illustrated schematically and freely selectable in their number, which building blocks partly function as interfaces to end users and third parties or alternatively to terminals 30, 40 of end users or third parties (see FIG. 2), as well as applications 13.1, 13.2, 13.3, 13.4, 13.5, 13.6, 14, also shown schematically as program building blocks, which are also freely selectable in their number.

In a first method step 101 of the method 100 of FIG. 1, one or more light functions are requested by the end user by means of one of the applications 13.1, 13.2, 13.3, 13.4, 13.5, 13.6, 14 for the implementation by one or more light sources 21.1, 21.2, 21.3 on the vehicle 20. This takes place at the device level in that the terminal 30, 40 of the end user and/or of a third party sends a signal with the requested light functions to the computer system 10. At the program level, the signal is generated by the respective application 13.1, 13.2, 13.3, 13.4, 13.5, 13.6, 14 and received by the programming interface 11 of the computer system 10.

The application 14 may, for example, be an application that does not require any programming on the part of the end user or of the third party. Instead, the programming of the desired or alternatively requested light function can be performed in the computer system 10 by means of a light function corresponding to one of the program building blocks 12.1, 12.2, 12.3, 12.4. For this purpose, it can be provided that the light functions are expressed as sets of parameters which are specified by the end user or third parties by means of the application 14. These light functions expressed as sets of parameters are then transmitted to the computer system 10 by means of a signal, in particular, wirelessly.

The other applications 13.1, 13.2, 13.3, 13.4, 13.5, 13.6, by means of which the end user or third party can send a request for a light function for one or more light sources of their vehicle 20 to the computer system 10, can be different from one another, for example, with regard to the intended use. For example, it is possible to request light functions when the vehicle 20 is stationary, for example, to display advertising or an exterior animation, this by means of one of the applications 13.1, 13.2, 13.3, 13.4, 13.5, 13.6, and to change light functions, for example, the interior lighting, for the moving vehicle 20, by means of another of the applications 13.1, 13.2, 13.3, 13.4, 13.5, 13.6.

In a second method step 102, the requested light functions are received by the computer system 10 or alternatively by a corresponding communication unit (not shown) of the computer system 10. This can be seen particularly well in FIG. 2, which shows respective wireless communication links 31, 41 between the computer system 10 and the terminals 30, 40.

In a third method step 103 of the method 100, the requested light functions are checked. In so doing, in one of the program building blocks 12.1, 12.2, 12.3, 12.4 of the computer program of the computer system 10, it is checked whether predetermined conditions of the light sources 21.1, 21.2, 21.3 are satisfied. This can take place, for example, by means of an alignment of parameters. The conditions may be, in particular, technical and/or regulatory, in particular, legal, conditions.

It can also be provided that the requested light functions are programmed in one of the further program building blocks 12.1, 12.2, 12.3, 12.4, if, as described above, programming of the requested light function is required.

If the requested light functions satisfy the predetermined conditions or alternatively the programming of the requested light functions has taken place, the requested light functions can be added or, if they already partially exist, extended in a fourth method step 104 of the method 100. For this purpose, the computer system 10 can send an enabling signal to the vehicle 20 or alternatively to a control device 22 of the vehicle 20 by means of a corresponding wireless communication link 15.

Figure 2:
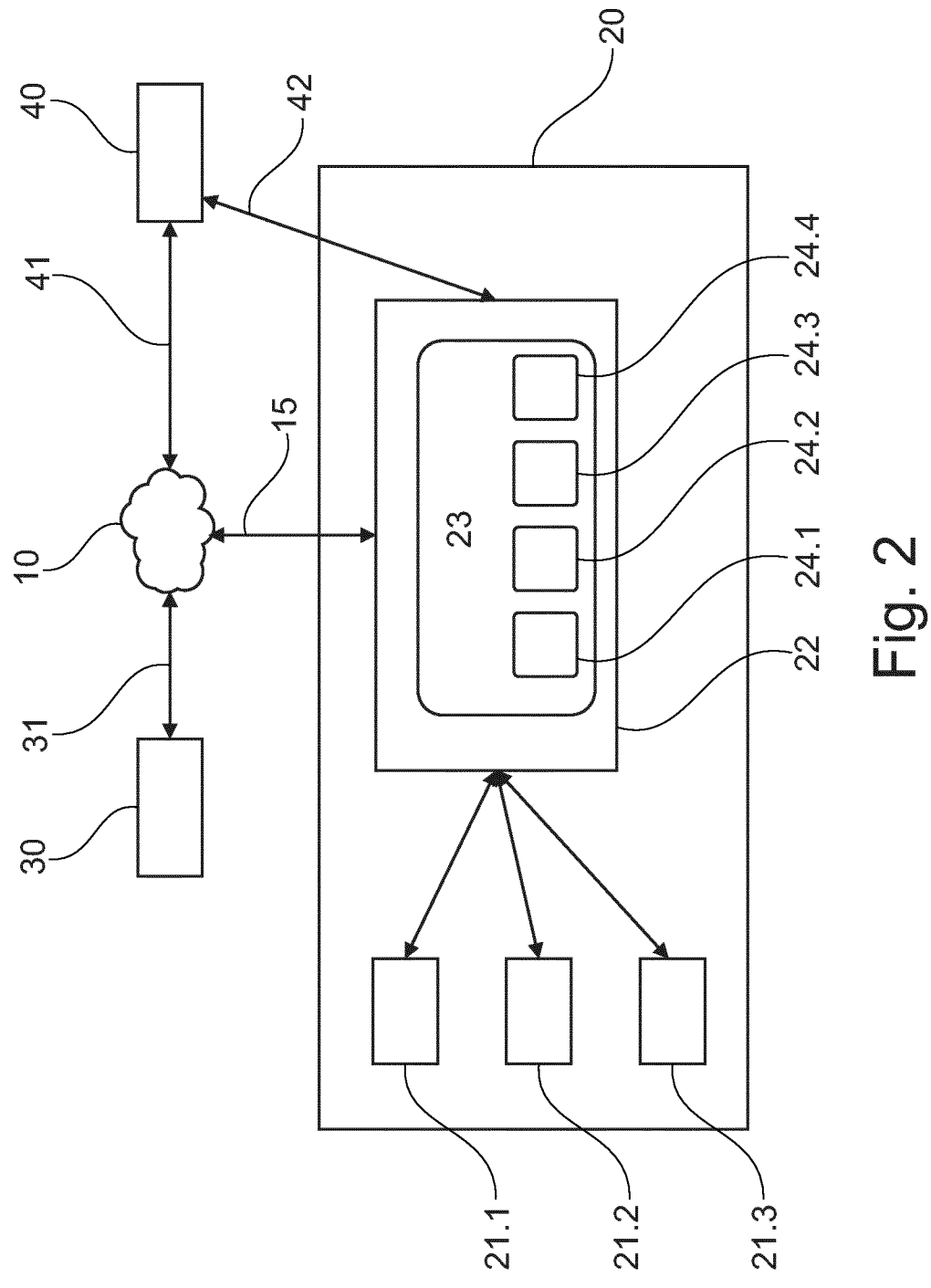
FIG. 2 shows a further schematic view comprising the system of FIG. 1 and terminals of end users.

FIG. 2 provides an insight into a possible in-vehicle control of the light sources 21.1, 21.2, 21.3 in the vehicle 20. The enabling signal is received by the control device 22, for example, via a further communication unit (not shown) of the vehicle 20. In turn, a control program 23 with various program building blocks 24.1, 24.2, 24.3, 24.4 is implemented on the control device 22. By means of one or all of the program building blocks 24.1, 24.2, 24.3, 24.4, it can now be provided that the light functions added and/or extended by means of the enabling signal are implemented on one or all of the light sources 21.1, 21.2, 21.3 of the vehicle 20.

For this purpose, in a fifth method step 205 of the method 200, the implementation of the added and/or extended light functions can finally be provided by the light sources 21.1, 21.2, 21.3. As can be seen in FIG. 2, it can be provided, for example, that the terminal 40 of the end user establishes a wireless communication link 42, for example, by means of UWB, Bluetooth or the like, with the vehicle 20 for communication with the control device 22 in order to implement the light functions added and/or extended in the control device 22.

Figure 3:
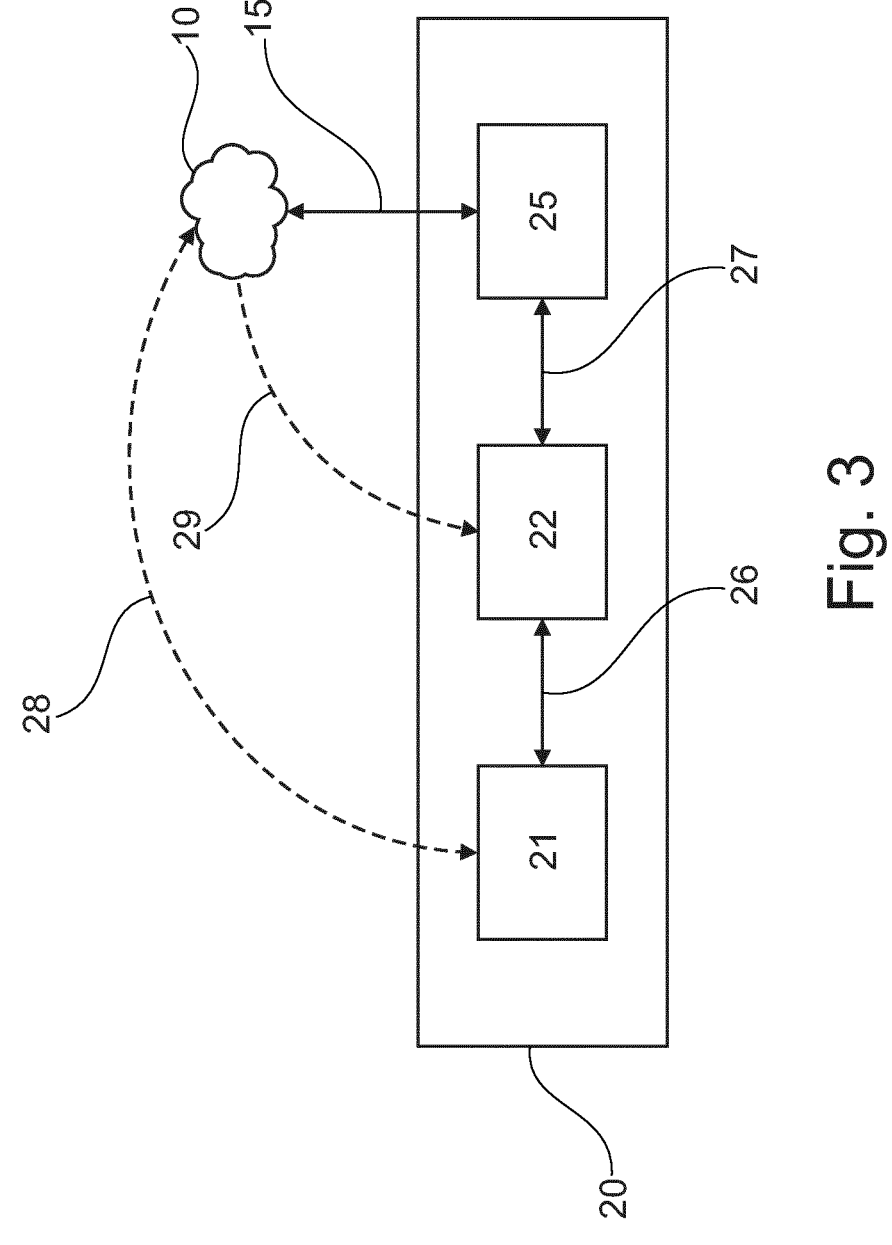
FIG. 3 shows a further schematic view of the system of FIG. 1.

FIG. 3 schematically shows a possibility of the computer system 10 to identify the light sources 21 of the vehicle 20. The configuration of the vehicle 20 can be identical to that of FIG. 2 or can be configured differently, as shown here by way of example in FIG. 3. In FIG. 3, by way of example, only one light source 21 is shown together with two control devices 22, 25. The control device 22 is a classic control device 22 of the light source 21, which communicate with each other via a bus connection 26. The control device 25 is, in turn, a central vehicle control device 25, which communicates with the control device 22 via an Ethernet connection 27.

The identification of the light source 21 is now performed by so-called "fingerprinting" 28 and the downloading of an assignment table 29 by the computer system 10 from the control device 22. The assignment table 29 assigns implementable light functions of the light source 21 to control signals sent to the light source 21 from the control device 22. In other words, the fingerprint of the light source 21 is received. This allows the computer system 10 to set up the conditions necessary for checking requested light functions, such as, in particular, technical conditions concerning the available light parameters at the light source 21.

LIST OF REFERENCE SIGNS

10 Computer system
11 Program building block, programming interface
12 Program building block
13 Program building block, application
14 Program building block, application
15 Wireless communication link
20 Vehicle
21 Light source
22 Control device
23 Control program
24 Program building block
25 Control device
26 Bus connection
27 Ethernet connection
28 Fingerprinting
29 Assignment table
30 Terminal
31 wireless communication link
40 Terminal
41 wireless communication link
42 wireless communication link

The invention claimed is:

1. A method for adding or extending at least one light function of at least one light source in at least one vehicle, wherein the method comprises the following steps, which are performed outside the at least one vehicle by a computer system that is physically remote from the at least one vehicle:
   receiving at least one requested light function from an end user for the implementation by the at least one light source in the at least one vehicle, the requested light function being received by the computer system;
   identifying, by the computer system, the at least one light source based on control signals received by the at least one light source;
   checking, by the computer system, whether the at least one requested light function satisfies at least one technical condition of the at least one light source as identified by the computer system; and
   adding or extending the at least one requested light function for the implementation of the at least one requested light function by the at least one light source by causing an enabling signal to be sent to the at least one vehicle, provided that the at least one requested light function satisfies the at least one technical condition of the at least one light source.

2. The method according to claim 1, wherein the at least one light source is an exterior lighting of the at least one vehicle.

3. The method according to claim 1, wherein the at least one condition further relates to a regulatory limitation of the at least one light source.

4. The method according to claim 1, wherein the at least one condition further relates to a prioritization of light functions that can be implemented simultaneously by the at least one light source.

5. The method according to claim 1, wherein the method further comprises processing the at least one requested light function, wherein the step of processing the at least one requested light function comprises adapting the at least one requested light function to the at least one condition.

6. The method according to claim 1, wherein the method comprises the further step of programming the at least one requested light function.

7. The method according to claim 6, wherein the step of programming the at least one requested light function is performed while adapting the at least one requested light function to the at least one light source or to the at least one vehicle.

8. The method according to claim 1, wherein the at least one requested light function comprises a set of parameters for the at least one light source.

9. A computer system for adding or extending the at least one light function of at least one light source in the at least one vehicle, wherein the computer system is configured for communication with the at least one vehicle, and wherein the computer system is configured to perform the method according to claim 1.

10. Computer-readable storage medium comprising instructions that, when implemented by a computer cause the computer to implement the method of claim 1.

* * * * *